US012766732B2

(12) United States Patent
Yan et al.

(10) Patent No.: US 12,766,732 B2
(45) Date of Patent: Oct. 20, 2026

(54) METHOD AND APPARATUS OF DETERMINING POINT FOR PROCESSING WORKPIECE

(71) Applicant: ABB Schweiz AG, Baden (CH)

(72) Inventors: Wenzhou Yan, Shanghai (CN); Tongshuai Zhu, Shanghai (CN); Lun Jiang, Shanghai (CN); Hao Chen, Shanghai (CN); Xiaodi Yu, Shanghai (CN)

(73) Assignee: ABB Schweiz AG, Baden (CH)

( * ) Notice: Subject to any disclaimer, the term of this patent is extended or adjusted under 35 U.S.C. 154(b) by 281 days.

(21) Appl. No.: 18/554,712

(22) PCT Filed: Apr. 22, 2021

(86) PCT No.: PCT/CN2021/089096

§ 371 (c)(1),
(2) Date: Oct. 10, 2023

(87) PCT Pub. No.: WO2022/222115

PCT Pub. Date: Oct. 27, 2022

(65) Prior Publication Data

US 2024/0208068 A1 Jun. 27, 2024

(51) Int. Cl.
*B25J 9/16* (2006.01)
*B25J 19/02* (2006.01)

(52) U.S. Cl.
CPC ............. *B25J 9/1697* (2013.01); *B25J 9/161* (2013.01); *B25J 19/023* (2013.01)

(58) Field of Classification Search
CPC ........ B25J 9/1697; B25J 9/161; B25J 19/023; G05B 2219/36504; G05B 19/401
See application file for complete search history.

(56) References Cited

U.S. PATENT DOCUMENTS

| | | | | |
|---|---|---|---|---|
| 7,869,899 | B2 * | 1/2011 | Hammond | B23P 6/007 700/193 |
| 2003/0200042 | A1 | 10/2003 | Gan et al. | |
| 2010/0098324 | A1 * | 4/2010 | Fujieda | G01B 11/272 382/218 |
| 2011/0238215 | A1 * | 9/2011 | Yanagawa | G05B 19/42 901/3 |
| 2023/0024736 | A1 * | 1/2023 | Ogura | G06T 7/70 |
| 2024/0066701 | A1 * | 2/2024 | Yamazaki | B25J 9/1671 |

FOREIGN PATENT DOCUMENTS

| | | | |
|---|---|---|---|
| CN | 110363801 | A | 10/2019 |
| CN | 110434671 | A | 11/2019 |
| DE | 102009000321 | A1 | 7/2010 |
| WO | 2020133873 | A1 | 7/2020 |

* cited by examiner

*Primary Examiner* — Adam R Mott
*Assistant Examiner* — Sagar Kc
(74) *Attorney, Agent, or Firm* — Whitmyer IP Group LLC

(57) ABSTRACT

Methods and devices for determining a point for processing a workpiece. The methods include receiving an input representing an offset for adjusting a sample workpiece point, the sample workpiece point corresponding to a workpiece point for processing the workpiece, adjusting the sample workpiece point based on the input, so as to generate an adjusted sample workpiece point, and determining the workpiece point based on the adjusted sample workpiece point.

6 Claims, 4 Drawing Sheets

METHOD AND APPARATUS OF DETERMINING POINT FOR PROCESSING WORKPIECE

CROSS-REFERENCE TO RELATED APPLICATIONS

This is a national stage application claiming priority to international patent application Serial No.: PCT/CN2021/089096, filed on Apr. 22, 2021; which is herein incorporated by reference in its entirety.

FIELD

Example embodiments of the present disclosure generally relate to the field of industrial robots and, more particularly, to a method and an apparatus of determining a point for processing a workpiece by an industrial robot.

BACKGROUND

A robot can be used in various fields. For example, the robot may be controlled to assist in a welding or a gluing of a workpiece. For some products, the requirement of processing accuracy is becoming increasingly important, such as in the automated production for the electronic devices.

In conventional solutions of high precision processing, the misalignment of workpiece loading and clamping and the workpiece machining will cause the offset of the processing path. Quality problems are incurred accordingly. Some approaches are proposed but they are not satisfactory. Therefore, there is a need for an improvement of the processing accuracy on the workpiece by means of the robot.

SUMMARY

Example embodiments of the present disclosure propose a solution to at least address the problems in the prior art and/or potential problems.

In a first aspect, example embodiments of the present disclosure relate to a method of determining a point for processing a workpiece. The method comprises receiving an input representing an offset for adjusting a sample workpiece point, the sample workpiece point corresponding to a workpiece point for processing the workpiece; adjusting the sample workpiece point based on the input, so as to generate an adjusted sample workpiece point; and determining the workpiece point based on the adjusted sample workpiece point.

According to example embodiments of the present disclosure, the adjustment of the points for processing can be carried out in an intuitive manner.

In some example embodiments, adjusting the sample workpiece point comprises: acquiring a plurality of model contour points representing a contour of a model associated with the sample workpiece and a model point representing a position for processing the model; acquiring a plurality of sample workpiece contour points representing a contour of the sample workpiece; and adjusting, based on the plurality of model contour points and the plurality of sample workpiece contour points, the sample workpiece point that corresponds to the model point for processing the sample workpiece. In this way, the accuracy of the processing path can be improved.

In some example embodiments, the input is received via a human machine interface. In this way, the user experience can be improved.

In some example embodiments, the method further comprises processing the workpiece based on the workpiece point. In this way, the processing of the target workpiece may be conducted in an accurate manner.

In some example embodiments, acquiring the plurality of workpiece contour points comprises: acquiring the plurality of workpiece contour points from a 3D camera. In this way, the workpiece contour points can be obtained in a reliable manner.

In some example embodiments, processing the workpiece comprises processing the workpiece based on any of: a gluing operation, a drilling operation, a machining operation, and a welding operation. In this way, the example embodiments according to the present disclosure can be applied in various scenarios.

In a second aspect, example embodiments of the present disclosure relate to an apparatus for determining a point for processing a workpiece. The apparatus comprising an input reception module configured to receive an input representing an offset for adjusting a sample workpiece point, the sample workpiece point corresponding to a workpiece point for processing the workpiece; an adjustment module configured to adjust the sample workpiece point based on the input, so as to generate an adjusted sample workpiece point; and a workpiece determination module configured to determine the workpiece point based on the adjusted sample workpiece point.

In some example embodiments, the adjustment module comprises: a model acquisition module configured to acquire a plurality of model contour points representing a contour of a model associated with the sample workpiece and a model point representing a position for processing the model; a sample workpiece acquisition module configured to acquire a plurality of sample workpiece contour points representing a contour of the sample workpiece; and the adjustment module is further configured to adjust, based on the plurality of model contour points and the plurality of sample workpiece contour points, the sample workpiece point that corresponds to the model point for processing the sample workpiece.

In some example embodiments, the input is received via a human machine interface.

In some example embodiments, the apparatus further comprises a processing module configured to process the workpiece based on the workpiece point.

In some example embodiments, acquiring the plurality of workpiece contour points comprises: acquiring the plurality of workpiece contour points from a 3D camera.

In some example embodiments, processing the workpiece comprises processing the workpiece based on any of: a gluing operation, a drilling operation, a machining operation, and a welding operation.

BRIEF DESCRIPTION OF THE DRAWINGS

Through the following detailed description of the example embodiments of the present disclosure with reference to the accompanying drawings, the above and other objectives, features and advantages of the present disclosure will become more apparent. In the drawings, a plurality of embodiments of the present disclosure is explained in a non-restrictive manner by way of examples, wherein.

DETAILED DESCRIPTION OF EMBODIMENTS

Figure 1:
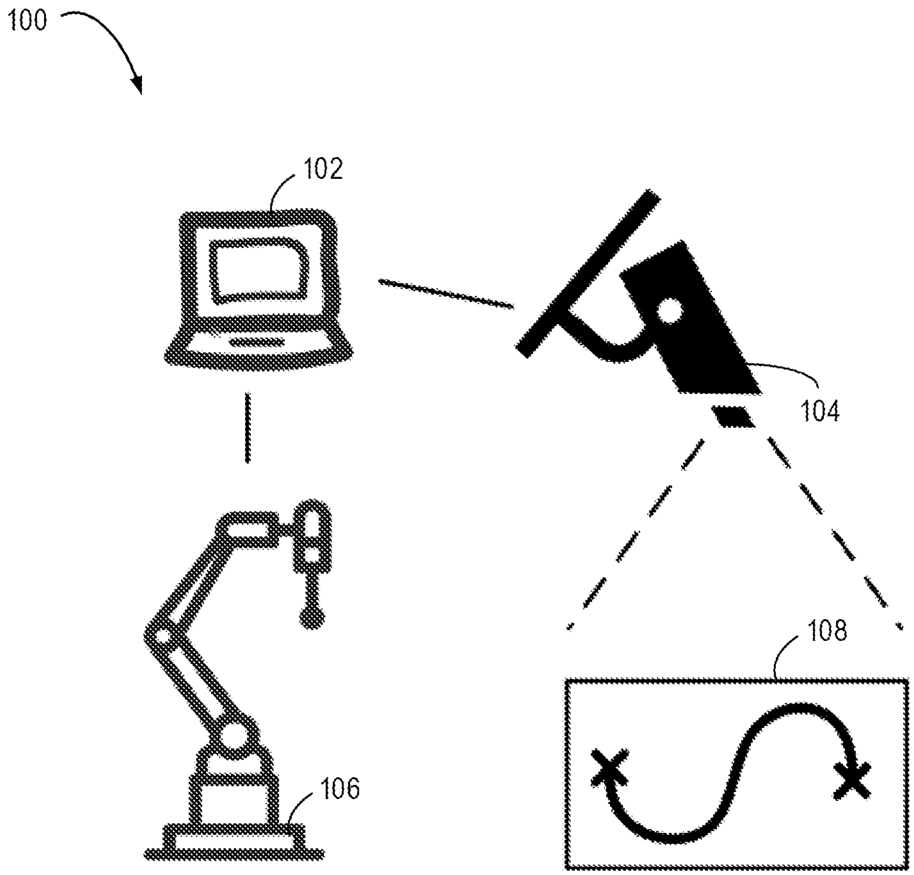
FIG. 1 illustrates an exemplary system in which example embodiments of the present disclosure may be implemented.

Principles of the present disclosure will now be described with reference to various example embodiments illustrated in the drawings. It should be appreciated that description of those embodiments is merely to allow those skilled in the art to better understand and further implement example embodiments disclosed herein and is not intended to limit the scope disclosed herein in any manner. It should be noted that similar or same reference signs can be used in the drawings when feasible, and similar or same reference signs can represent the similar or same functions. Those skilled in the art can readily recognize that alternative embodiments of the structure and method described herein can be employed from the following description without departing from the principles of the present disclosure described herein.

As used herein, the term "comprises" and its variants are to be read as open-ended terms that mean "comprises, but not limited to." The term "based on" is to be read as "based at least in part on." The terms "one embodiment" and "embodiment" are to be read as "at least one embodiment." The term "a further embodiment" is to be read as "at least a further embodiment." The terms "first", "second" and so on can refer to same or different objects. The following text also can include other explicit and implicit definitions. Definitions of the terms are consistent throughout the description unless the context indicates otherwise.

As mentioned above, in the real cases of processing a workpiece, there may be misalignment between the real workpiece and the ideal workpiece. For example, in one aspect, the workpiece grasped by a robot may be moved to a location which is not exactly the desired location. In other cases, even though the workpiece may be located in a desired location, the real dimension of the workpiece may be different from designed dimension considering the manufacturing error. In a word, the misalignment between the workpiece and the model is commonly seen in the field of industrial robots and may cause the workpiece to be processed improperly, especially in the field where a high accuracy of processing is required.

The embodiment will generally be described herein in the context of gluing for a workpiece. It is to be understood that this is merely illustrative, rather than restrictive. The skilled artisan would envisage that the embodiments described herein can also be used in other cases, for example, a welding operation of a workpiece, a machining operation, a drilling operation of a workpiece, etc. It is to be understood that the embodiment described herein can also be used in other cases, which are already known or to be developed in the future, not listed in the text.

Example embodiments will be described in more detail hereinafter in accordance with FIGS. 1-6.

FIG. 1 illustrates an exemplary system 100 in which example embodiments of the present disclosure may be implemented. The system 100 as illustrated generally comprises a human machine interface 102, an image capturing device 104, a robot 106 and a workpiece 108 to be processed. The human machine interface 102 may comprise a controller configured to control the operation of the system 100.

In some example embodiments, the human machine interface 102 as illustrated may be a desktop. It is to be understood that this is merely an example, without suggesting any limitation as to the scope of the disclosure. For example, in other embodiments, the human machine interface 102 may be a teach pendant or a tablet which can be held by the user.

In some example embodiments, the image capturing device 104 may be a 3D camera configured to capture points of a workpiece 108 including a set of depth information reflected from the workpiece 108. The robot 106 as illustrated may be a multiple-axis robot which comprises one or more arms actuated to perform a particular action according to the instruction from the human machine interface 102. For example, the arms of the robot 106 may be controlled to conduct a gluing operation to the workpiece 108 on a transmission belt.

Figure 2:
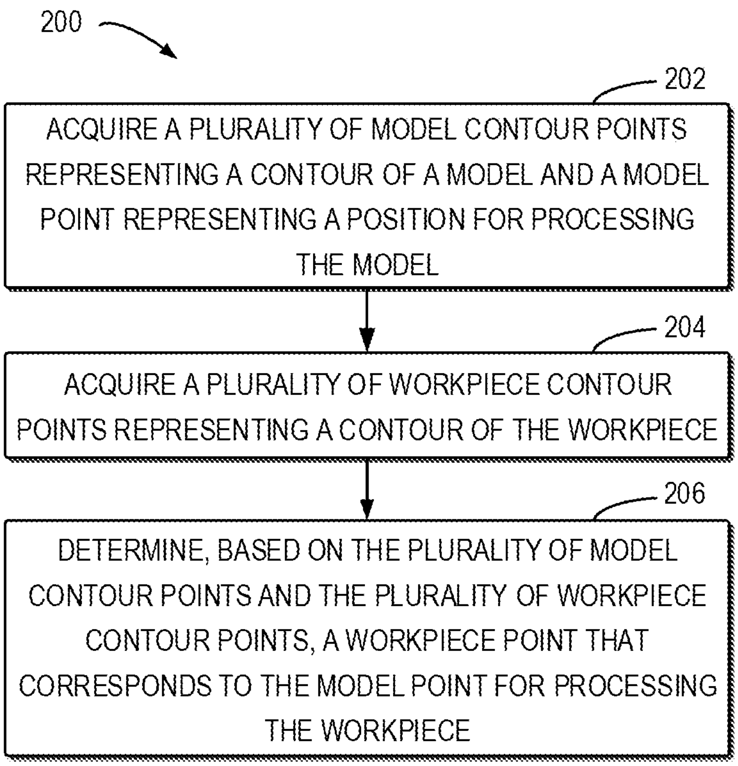
FIG. 2 illustrates a flowchart of a method in accordance with an example embodiment of the present disclosure.

FIG. 2 illustrates a flowchart of a method 200 in accordance with an example embodiment of the present disclosure. The method 200 may be carried out by the controller of the human machine interface 102.

At block 202, a plurality of points are required. The plurality of points may comprise a plurality of model contour points which represent a contour of a model associated to the workpiece 108. The plurality of points may further comprise a model point representing a position for processing the model. In some example embodiments, the plurality of points may further comprise a set of model points representing a number of positions for processing the model. In some example embodiments, the plurality of points may be derived by commercially available software such as CAD, CATIA, ProE, etc. In other example embodiments, the plurality of points may be the points located on a sample workpiece which can be obtained by the image capturing device 104 such as a 3D camera. The scope of the present disclosure is not limited in this regard.

At block 204, a plurality of workpiece contour points which represent a contour of the workpiece 108 are acquired. In some example embodiments, the plurality of workpiece contour points may be obtained by means of the image capturing device 104. It is to be understood that the number of the workpiece contour points may be varied according to the performance of the image capturing device 104, as long as those points may reflect the outer contour of the workpiece 108. The scope of the present disclosure is not limited in this regard.

At block 206, based on the plurality of model contour points and the plurality of workpiece contour points, a workpiece point that corresponds to the model point for processing the workpiece may be determined. In some example embodiments, the plurality of model contour points and the model point may be mapped onto the workpiece 108, so as to acquire a plurality of mapped model contour points and a mapped model point. Afterwards, based on the relationship between the plurality of mapped model contour points and the plurality of workpiece contour points of the workpiece 108, the mapped model point may be adjusted to determine the workpiece point corresponding to the model point for processing the workpiece.

According to example embodiments of the present disclosure, if there is a deviation between the workpiece and the model, the workpiece point can be adjusted to a proper location for processing.

In some example embodiments, at block 206, determining the workpiece point may comprise aligning the workpiece to the model based on the plurality of model contour points and the plurality of workpiece contour points; and identifying the workpiece point based on a point corresponding to the model point that is mapped to a contour of the aligned workpiece. In these example embodiments, if the contour of the workpiece 108 is almost identical to the model but the workpiece 108 is not located in a desired position (for example, the workpiece 108 may be offset from the desired location due to a tilting of a station), by aligning the workpiece to the model based on the plurality of model contour points and the plurality of workpiece contour points, such an error may be effectively eliminated. In other words, the inaccuracy of the processing caused by improper locating of the workpiece 108 may be avoided.

In some example embodiments, aligning the workpiece to the model may further comprise determining a workpiece matrix for transforming the plurality of model contour points to the plurality of workpiece contour points based on the plurality of model contour points and the plurality of workpiece contour points; and identifying the workpiece point comprises: determining the workpiece point based on the workpiece matrix and the model point. It is to be appreciated that a variety of methods to determine the matrix for transforming may be used and the specific form of the matrix may be selected according to different usage scenarios. The scope of the present disclosure is not limited in this regard.

In some cases, the locating of the workpiece 108 is relatively accurate but the workpiece 108 is not precisely manufactured. Some example embodiments intended to cure such an error will be described hereinafter with reference to FIG. 3, which illustrates an exemplary groove 302 and the relevant section 304 of the workpiece 108 in accordance with example embodiments of the present disclosure.

In the illustrated embodiments, determining the workpiece point may comprise determining a workpiece section 304 of a workpiece groove 302 of the workpiece 108 based on the plurality of workpiece contour points. In some example embodiments, the section 304 may be derived from the intersection of the plurality of workpiece contour points and a cross-section A-A of the workpiece 108. The formation of the cross-section A-A will be described in the following text with reference to FIG. 4.

The workpiece groove 302 is adapted to process the workpiece 108. In the case that the workpiece 108 is being glued, the workpiece groove 302 is a gluing groove for accommodating the glue to be applied onto the workpiece 108.

Figure 3:
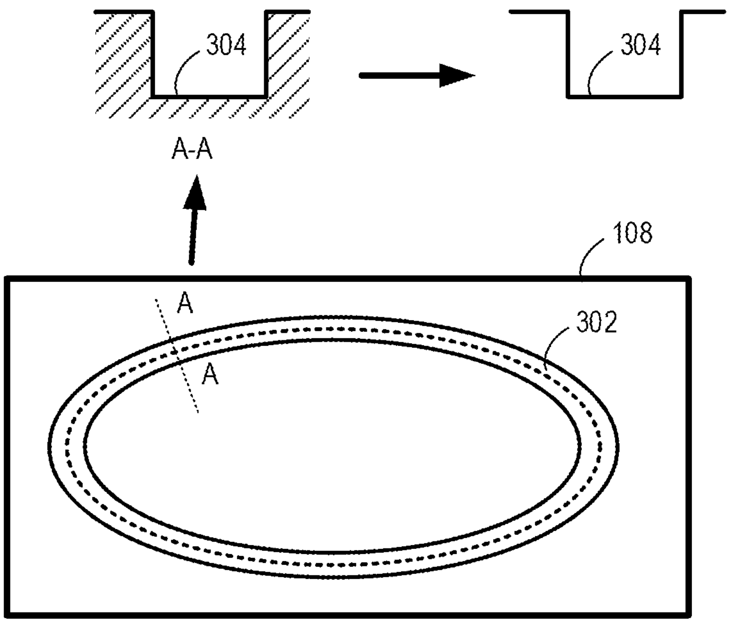
FIG. 3 illustrates an exemplary groove and the relevant section of the workpiece in accordance with example embodiments of the present disclosure.

It is to be understood that the manner of determining the section described with reference to FIG. 3 is not only suitable for obtaining sections from the workpiece 108, but also suitable for obtaining sections from the model.

With the analogous method described above, determining the workpiece point may further comprise determining a model section of a model groove of the model based on the model point, the model groove being adapted to process the model. Based on a positional relationship between the model section and the workpiece section 304, an offset of a point in the workpiece section 304 may be acquired. Based on the workpiece point mapped from the model point and the amount of offset, an adjusted workpiece point may be determined. It is to be understood that the section mapping described herein is merely an exemplary manner, those skilled in the art would envisage utilizing other methods to determine the adjusted workpiece point. For example, the user may acquire the shape and dimensions of the workpiece section 304 and adjust the workpiece point based on the acquired shape and dimensions.

With the example embodiments, the misalignment between the workpiece 108 and the model resulting from the manufacturing error can be eliminated.

Figure 4:
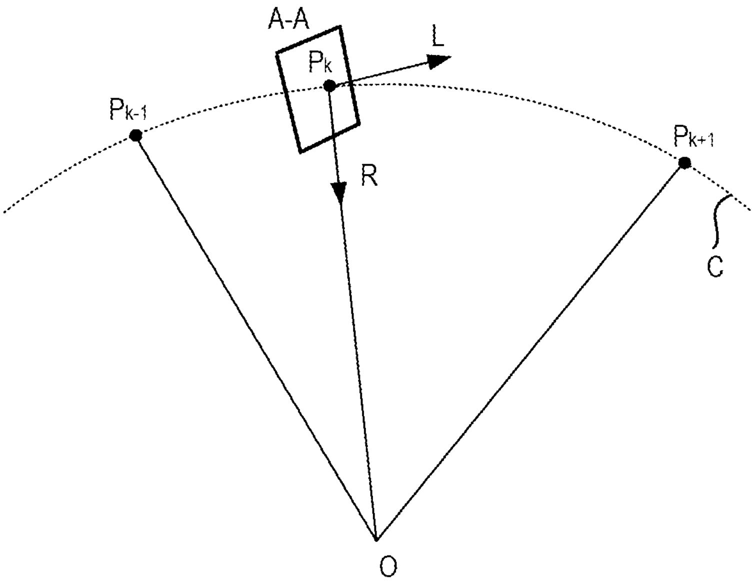
FIG. 4 illustrates an exemplary manner of determining a section of a workpiece in accordance with example embodiments of the present disclosure.

FIG. 4 illustrates an exemplary manner of determining the section A-A of a workpiece 108 at the point $P_k$ in accordance with example embodiments of the present disclosure.

First, among the points along the gluing groove, two points $P_{k-1}$, $P_{k+1}$ immediately adjacent to the point $P_K$ are acquired. Based on the three points $P_{k-1}$, $P_k$, and $P_{k+1}$, a central point O is determined and the three points $P_{k-1}$, $P_K$, and $P_{K+1}$ are equidistant from the central point O. Then, a circle C may be derived based on the three points $P_{k-1}$, $P_k$, and $P_{k+1}$ and the central point O. The center of the circle C is the point O. A tangent L of the point $P_k$ with respect to the circle C can be determined. Finally, the section A-A at the point is $P_k$ determined based on the tangent L, wherein the tangent L is parallel to the normal vector of the section A-A.

It is to be understood that the manner of determining the section A-A described above is merely illustrative, rather than restrictive. The skilled artisan may other ways as well according to the actual requirement.

For example, in some other embodiments, if the point $P_k$ is the beginning point along the groove, then the determination of the section A-A at the point $P_k$ is merely based on the point $P_k$ and subsequent point $P_{k+1}$, assuming that the direction R from the point $P_k$ to the central point O is equal to the direction R from the point $P_{k+1}$ to the central point O. In further example embodiments, if the point $P_k$ is the ending point along the groove, then the determination of the section A-A at the point $P_k$ is merely based on the point $P_k$ and preceding point $P_{k-1}$, assuming that the direction R from the point $P_k$ to the central point O is equal to the direction R from the point $P_{k-1}$ to the central point O. The scope of the present disclosure is not limited in this regard.

In some example embodiment, a sample workpiece may be used to assist in the adjustment of the workpiece point. The sample workpiece can be regarded as an ideal workpiece based on the model. In some example embodiments, the sample workpiece can be utilized as an intermediate object between the model and the real workpiece 108. The method described above to determine a point for processing the workpiece 108 from the model can be applied from the model onto sample workpiece to determine a point for processing the sample workpiece and then from the sample workpiece onto the real workpiece 108 to determine a point for processing the real workpiece 108.

In some example embodiments, the method may further comprise acquiring a plurality of target workpiece contour points representing a contour of a target workpiece that is to be processed; and determining, based on the plurality of model contour points and the plurality of target workpiece contour points, a target workpiece point corresponding to the model point for processing the workpiece.

Figure 5:
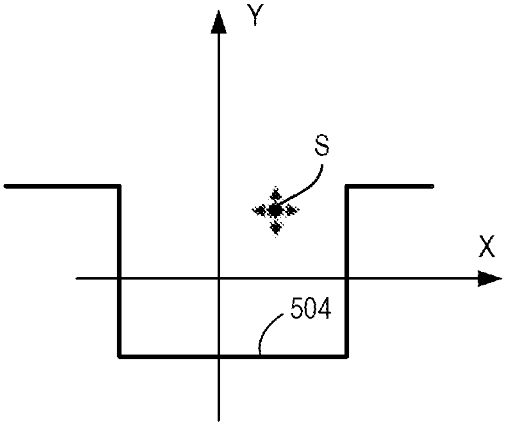
FIG. 5 illustrates exemplary display content for a user to adjust the point for processing in accordance with example embodiments of the present disclosure.

FIG. 5 illustrates exemplary display content for a user to adjust the point for processing in accordance with example embodiments of the present disclosure.

In some example embodiments, the user can see the section 504 for the sample workpiece on a screen of human machine interface 102. The user is allowed to adjust the point S on the screen. Once the adjusted point S is determined, its coordinate relative to the coordinate system establish on the sample workpiece is then determined. Through the steps described above, the adjusted point S can be mapped onto a coordinate system established on the workpiece. Therefore, the point for the processing can be adjusted accordingly.

With these example embodiments, the user can adjust the point in a straightforward manner without professional knowledge about the whole system 100. In other words, what the users need to do is to merely adjust the position of the point on the screen, which greatly improves the user experience.

It is to be understood that the adjusted point based on the input from the user may be used for various purposes. For example, it can be used to assist in adjusting the processing point on the workpiece. However, it can also be used in other applications.

When determining the point for processing, if those points have been properly located, the adjusted point for processing based on the input from the user may be directly used in some example embodiments.

It is further to be understood that the input from the user is not necessarily required in some example embodiment. For example, if the accuracy of processing meets the requirement of the user, the input from the user can be omitted.

Figure 6:
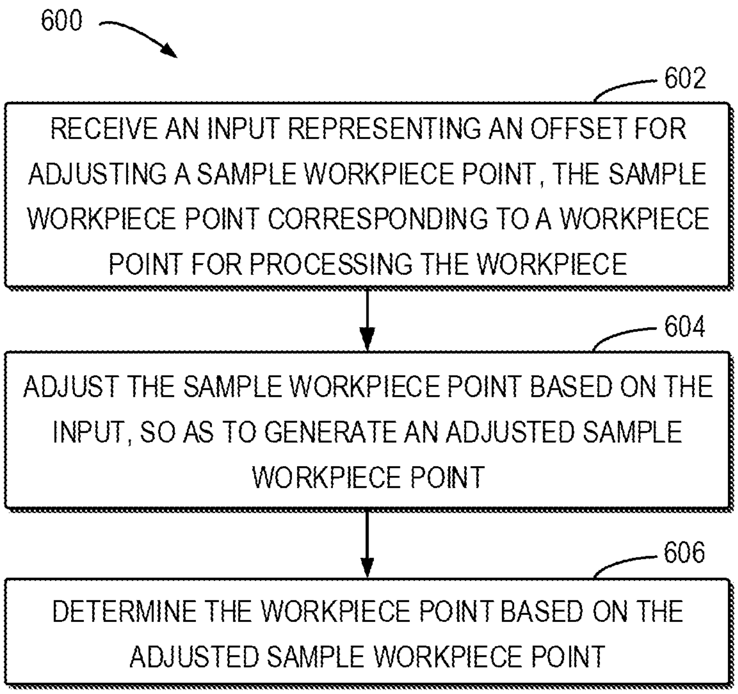
FIG. 6 illustrates a flowchart of a method in accordance with another example embodiment of the present disclosure.

FIG. 6 illustrates a flowchart of a method 600 in accordance with another example embodiment of the present disclosure.

At block 602, an input representing an offset for adjusting the sample workpiece point is received. The sample workpiece point corresponds to the workpiece point for processing the workpiece. In some example embodiments, the input may reflect the information on the positional relationship of desired point relative to the section of the sample workpiece.

At block 604, the sample workpiece point is adjusted based on the input, so as to generate an adjusted sample workpiece point.

At block 606, the workpiece point is determined based on the adjusted sample workpiece point.

In a second aspect, example embodiments of the present disclosure relate to an apparatus for determining a point for processing a workpiece. The apparatus comprising an input reception module configured to receive an input representing an offset for adjusting a sample workpiece point, the sample workpiece point corresponding to a workpiece point for processing the workpiece; an adjustment module configured to adjust the sample workpiece point based on the input, so as to generate an adjusted sample workpiece point; and a workpiece determination module configured to determine the workpiece point based on the adjusted sample workpiece point.

In some example embodiments, the adjustment module may further comprise: a model acquisition module configured to acquire a plurality of model contour points representing a contour of a model associated with the sample workpiece and a model point representing a position for processing the model; a sample workpiece acquisition module configured to acquire a plurality of sample workpiece contour points representing a contour of the sample workpiece; and the adjustment module is further configured to adjust, based on the plurality of model contour points and the plurality of sample workpiece contour points, the sample workpiece point that corresponds to the model point for processing the sample workpiece.

In some example embodiments, the input may be received via a human machine interface.

In some example embodiments, the apparatus may further comprise a processing module configured to process the workpiece based on the workpiece point.

In some example embodiments, acquiring the plurality of workpiece contour points may comprise: acquiring the plurality of workpiece contour points from a 3D camera.

In some example embodiments, processing the workpiece may comprise processing the workpiece based on any of: a gluing operation, a drilling operation, a machining operation, and a welding operation.

Compared with the conventional approaches, the negative effects owing to the misalignment between the workpiece and the model can be reduced. Therefore, the processing onto the workpiece can be conducted precisely.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but is not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of determining a point for processing a workpiece, comprising:

receiving, via a human machine interface, an input representing an offset for adjusting a sample workpiece point, the sample workpiece point corresponding to a workpiece point for processing the workpiece, wherein the user is able to adjust the sample workpiece point on a screen of the human machine interface;

acquiring, from a 3D camera, a plurality of sample workpiece contour points representing a contour of the sample workpiece;

determining, based on a plurality of model contour points and the plurality of sample workpiece contour points, a workpiece matrix for transforming the plurality of model contour points to the plurality of sample workpiece contour points;

adjusting the sample workpiece point based on the input, so as to generate an adjusted sample workpiece point as an adjusted point on the screen;

determining the workpiece point based on the adjusted sample workpiece point by mapping the adjusted sample workpiece point onto a coordinate system established on the workpiece;

wherein determining the workpiece point comprises determining a workpiece section of a workpiece groove of the sample workpiece based on the plurality of workpiece contour points; and processing the workpiece based on the workpiece point using an industrial robot.

2. The method of claim 1, wherein adjusting the sample workpiece point comprises:

acquiring a plurality of model contour points representing a contour of a model associated with the sample workpiece and a model point representing a position for processing the model;

and adjusting, based on the plurality of model contour points and the plurality of sample workpiece contour points, the sample workpiece point that corresponds to the model point for processing the sample workpiece.

3. The method of claim 1, wherein processing the workpiece comprises processing the workpiece based on any of: a gluing operation, a drilling operation, a machining operation, and a welding operation.

4. An apparatus of determining a point for processing a workpiece, comprising:

an input reception module configured to receive an input via a human machine interface including a screen representing an offset for adjusting a sample workpiece point, the sample workpiece point corresponding to a workpiece point for processing the workpiece, wherein a user is able to adjust the sample workpiece point on the screen;

a sample workpiece acquisition module configured to acquire, from a 3D camera, a plurality of sample workpiece contour points representing a contour of the sample workpiece;

an adjustment module configured to adjust the sample workpiece point based on the input, so as to generate an adjusted sample workpiece point as an adjusted point on the screen;

wherein the adjustment module is configured to determine, based on a plurality of model contour points and the plurality of sample workpiece contour points, a workpiece matrix for transforming the plurality of model contour points to the plurality of sample workpiece contour points;

a workpiece determination module configured to determine the workpiece point based on the adjusted sample workpiece point by mapping the adjusted sample workpiece on the screen;

wherein determining the workpiece point comprises determining a workpiece section of a workpiece groove of the sample workpiece based on the plurality of workpiece contour points; and a processing module configured to process the workpiece based on the workpiece point using an industrial robot.

5. The apparatus of claim 4, wherein the adjustment module comprises:

a model acquisition module configured to acquire a plurality of model contour points representing a contour of a model associated with the sample workpiece and a model point representing a position for processing the model;

and wherein the adjustment module is further configured to adjust, based on the plurality of model contour points and the plurality of sample workpiece contour points, the sample workpiece point that corresponds to the model point for processing the sample workpiece.

6. The apparatus of claim 4, wherein processing the workpiece comprises processing the workpiece based on any of: a gluing operation, a drilling operation, a machining operation, and a welding operation.

* * * * *